United States Patent [19]

Arai et al.

[11] Patent Number: 4,531,623
[45] Date of Patent: Jul. 30, 1985

[54] SHIFT FORK IN A TRANSMISSION FOR AN AUTOMOBILE INCLUDING PAWL MEMBERS WITH STEPPED OUTER PORTIONS

[75] Inventors: Hajime Arai, Aichi; Shozi Haga; Tadashi Nozaki, both of Toyota, all of Japan

[73] Assignee: Toyota Jidosha Kabushiki Kaisha, Aichi, Japan

[21] Appl. No.: 396,115

[22] Filed: Jul. 7, 1982

[30] Foreign Application Priority Data

Aug. 8, 1981 [JP] Japan ............................ 56-117933[U]

[51] Int. Cl.³ .......................... G05G 3/00; G05G 9/12; F16D 11/10
[52] U.S. Cl. .................. 192/82 R; 74/473 R
[58] Field of Search ................. 192/53 F, 99 A, 99 R, 192/82 R; 74/473 R

[56] References Cited

U.S. PATENT DOCUMENTS 3,915,027 10/1975 Simmons et al. ............. 192/82 R X
4,238,012 12/1980 Takiguchi et al. ........... 192/53 F X
4,353,449 10/1982 Lamy et al. ..................... 192/82 R

FOREIGN PATENT DOCUMENTS 0144580 11/1979 Japan ................... 74/473 R
0144582 11/1979 Japan ................... 74/473 R
0002815  1/1980 Japan ................... 192/82 R Primary Examiner—Rodney H. Bonck
Assistant Examiner—David D. House
Attorney, Agent, or Firm—Parkhurst & Oliff

[57] ABSTRACT

Disclosed herein is a shift fork in a transmission for an automobile having a fork body made of steel plate and a pawl member made of resin fixed to the free ends of the fork body and adapted to engage an annular groove defined on the outer circumference of a hub sleeve included in a clutch mechanism for the transmission.

The pawl member has a stepped portion formed at the opposed portion to the outer peripheral edge of the annular groove so as not to abut against the outer peripheral edge during a shift operation.

1 Claim, 7 Drawing Figures

SHIFT FORK IN A TRANSMISSION FOR AN AUTOMOBILE INCLUDING PAWL MEMBERS WITH STEPPED OUTER PORTIONS

BACKGROUND OF THE INVENTION

This invention relates to a shift fork in a transmission for an automobile, and more particularly to a shift fork having a fork body made of a steel plate and a pawl member made of resin adapted to be fixed to the free ends of the fork body.

As is well known in the art, a pawl member of a shift fork fixedly supported by a fork shaft is adapted to engage an annular groove formed on the outer periphery of a hub sleeve carried in a clutch mechanism of the transmission. During the shift operation where a shift fork comprised of a fork body made of steel plate and a pawl member made of resin is moved into a hub sleeve, the shift fork is tilted relative to the hub sleeve due to the clearance defined between the annular groove of the hub sleeve and the pawl member engaged with the annular groove, or due to the deflection of the fork body. When the shift fork tilts, a part of the pawl member opposite to the outer peripheral edge of the annular groove abuts against the outer peripheral edge, thereby causing cracks and damage to the pawl member.

SUMMARY OF THE INVENTION

Accordingly, a primary object of the present invention is to provide a shift fork which has a pawl member formed with a stepped portion so as not to abut against the outer peripheral edge of the hub sleeve during the shift operation.

Another object of the present invention is to provide a shift fork which may prevent damage to the resin pawl member of the shift fork without interference with the outer peripheral edge of the annular groove, so as to increase durability of the shift fork.

According to the present invention, a part of the pawl member provided at the free ends of the fork body of the shift fork is formed with a stepped portion so as not to abut against the outer peripheral edge of the hub sleeve carried in a clutch mechanism of a transmission.

Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENTS

Figure 1:
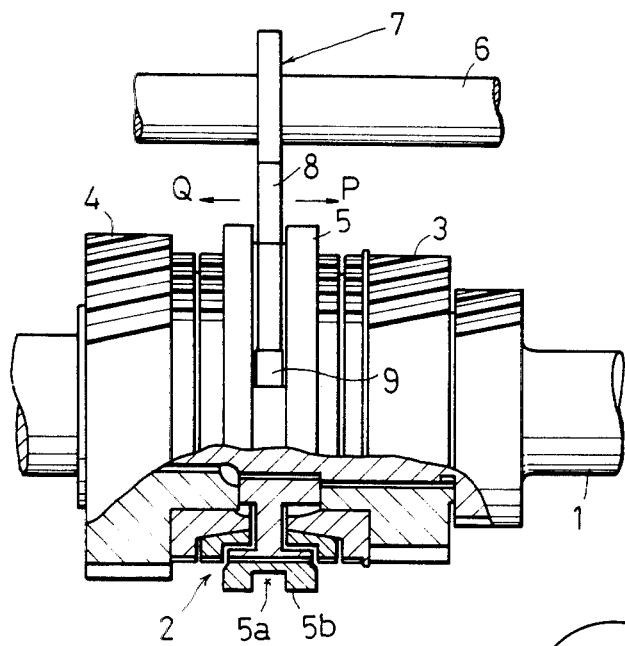
FIG. 1 is a side elevational view, partially in section, of a shift fork carried in a clutch mechanism according to the present invention.

Referring now to FIG. 1, reference numeral 2 designates a clutch mechanism or a synchromesh unit for a gear transmission. Reference numerals 3 and 4 designate speed change gears supported by a shaft 1 with the clutch mechanism 2 interposed therebetween.

The clutch mechanism 2 includes a hub sleeve 5 having an annular groove 5a defined along the outer circumference thereof. A shift fork 7 is composed of a fork body 8 made of steel plate which is fixed to a fork shaft 6 and a pawl member 9 made of resin which encloses the free ends 8a. The pawl member 9 is adapted to engage the annular groove 5a. The shift fork 7 is adapted to move in the directions depicted by arrows P and Q to effect a shift operation.

Figure 3:
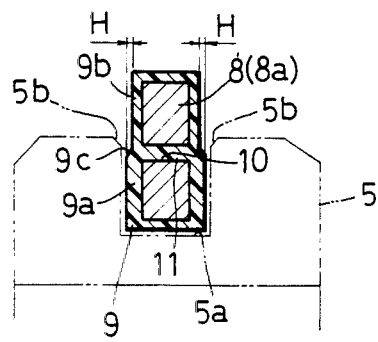
FIG. 3 is an enlarged cross-sectional view taken along the line III—III in FIG. 2.
Figure 4:
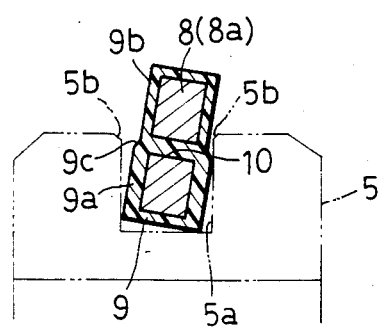
FIG. 4 is a view similar to FIG. 3, illustrating the shift fork as it is tilted relative to the hub sleeve.

Referring next to FIG. 3, each of the side portions designated by 9a of the pawl member 9 is disposed in opposed relation to the side inner wall of the annular groove 5a of the hub sleeve 5, and it forms a thick wall. On the other hand, each of the side portions designated by 9b of the pawl member 9 is defined from the portion opposed to the outer peripheral edge 5b of the annular groove 5a to the portion extending outwardly from the outer peripheral edge 5b, and it forms a thin wall. Accordingly, the pawl member 9 includes a stepped portion 9c at the boundary between the thick-walled portion 9a and the thin-walled portion 9b. The difference designated by H between the thick-walled portion 9a and the thin-walled portion 9b is determined in such a manner that the portion of the pawl member opposed to the outer peripheral edge 5b of the annular groove 5a does not abut against the outer peripheral edge 5b when the shift fork 7 is tilted from the hub sleeve 5 during the shift operation (see FIG. 4).

Figure 2:
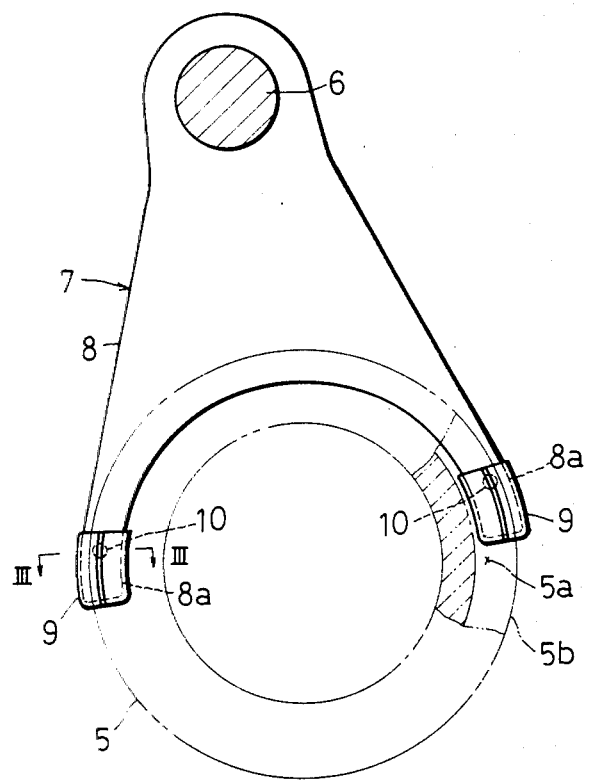
FIG. 2 is an enlarged elevational view of the shift fork.
Figure 5:
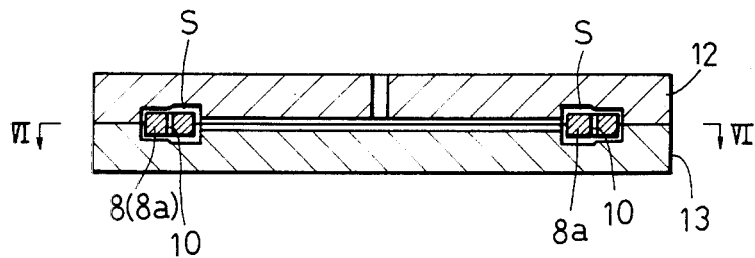
FIG. 5 is a schematic illustration of the metal mold employable for molding the pawl member of the shift fork.
Figure 6:
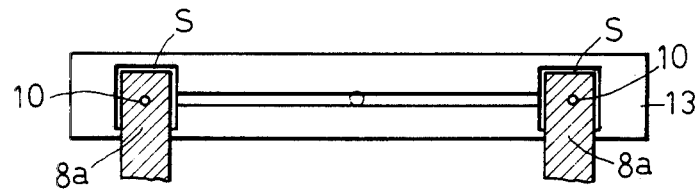
FIG. 6 is a plan view of FIG. 5 taken along the line VI—VI in FIG. 5.
Figure 7:
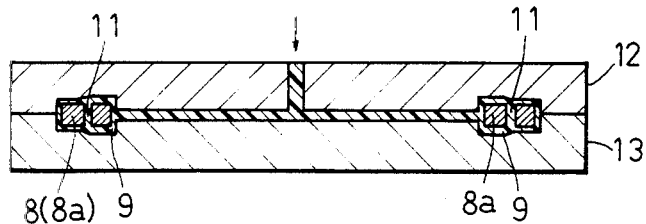
FIG. 7 is a schematic illustration similar to FIG. 5, showing the mold cavity as it is injected with resin.

As shown in FIGS. 2 and 3, free ends 8a of the fork body 8 are provided with a stopper hole 10 which is adapted to engage a stopper member 11, and as the result, the pawl member 9 is prevented from being withdrawn from the free ends 8a. As shown in FIGS. 5 and 6, the forked free ends 8a of the fork body 8 are inserted into the cavity S defined by a pair of metal molds 12 and 13 for injection molding, and thereafter synthetic resin is injected into the cavity S to form a pawl member 9 enclosing the free ends 8a. At the same time, the stopper hole 10 of the fork body 8 is filled with synthetic resin to form a stopper member 11.

In operation when the shift fork 7 is moved in the direction, depicted by P in FIG. 1 and the hub sleeve 5 is also moved in the same direction, the speed change gear 3 is brought into engagement with the shaft 1 to obtain predetermined shift position such as a third speed gear position. On the contrary, when the shift fork 7 is moved in the direction depicted by Q in FIG. 1, the speed change gear 4 is brought into engagement with the shift 1 to obtain another predetermined shift position such as a fourth speed gear position.

As should be apparent from the aforementioned description, the pawl member 9 includes the stepped portion 9c having a small thickness positioned in opposed relation to the outer peripheral edge 5b of the annular groove 5a. Accordingly, even when the shift fork 7 is tilted from the hub sleeve 5, due to the clearance between the annular groove 5a and the pawl member 9 or due to the deflection of the fork body 8 during the shift operation, the pawl member 9 does not abut against the outer peripheral edge 5b of the annular groove 5a, thereby preventing damages to the pawl member 9.

Having thus described the preferred embodiments of the invention it should be understood that numerous structural modifications and adaptations may be resorted to without departing from the spirit of the invention.

What is claimed is:

1. A shift fork in a transmission for an automobile comprising:

a fork body having a steel plate member with substantially planar free ends defining a fork, said fork body being supported by a fork shaft, said free ends engaging an annular groove defined along an outer circumference of a hub sleeve carried in a clutch mechanism for said transmission, each free end having a stopper hole extending therethrough; and a pawl member formed of resin fixed to each free end of said fork body and covering the entire cross-sectional and circumferential extent of each free end of said fork body to protect the entire length of said free ends from said annular groove of said hub sleeve, each pawl member having a stopper member extending through the stopper hole in the corresponding free end for preventing said pawl member from being withdrawn from said corresponding free end, a thick portion for engaging said annular groove, a thin portion disposed partially within and extending above said annular groove, and a transitional portion bridging said thick and thin portions, said transitional portion being positioned substantially entirely within said annular groove;

each transitional portion maintaining a gap between said thin portion and said annular groove during shift operations to prevent contact between said thin portion of said pawl member and said annular groove of said hub sleeve, thereby to protect said thin portion.

* * * * *